July 13, 1965  D. FAURE  3,194,319
SERVO-CONTROL DEVICE FOR RAISING TRACTOR-HAULED EQUIPMENT
Filed May 16, 1963  7 Sheets-Sheet 1

DANIEL FAURE
INVENTOR.
BY: Nolte & Nolte
ATTORNEYS

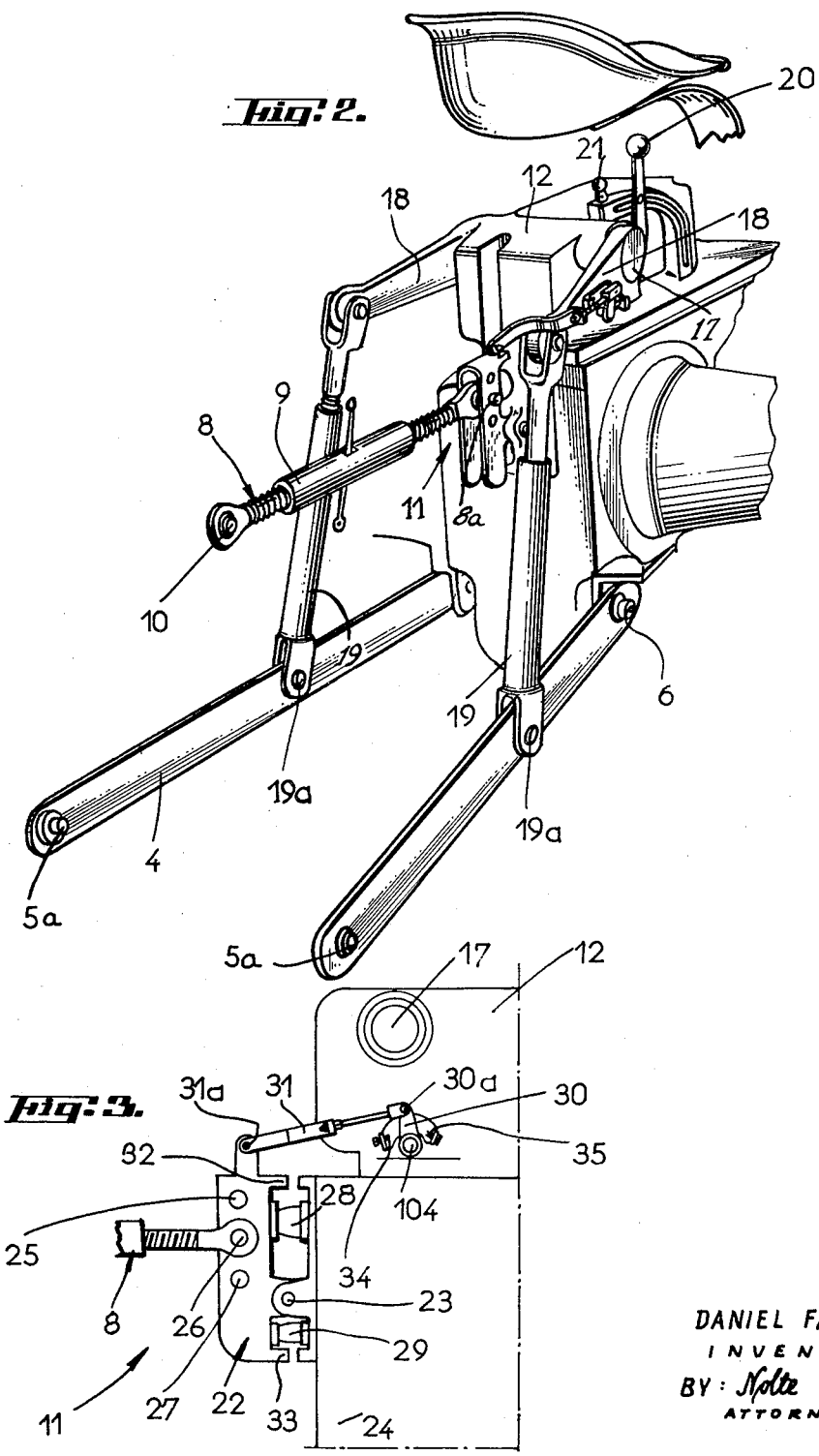

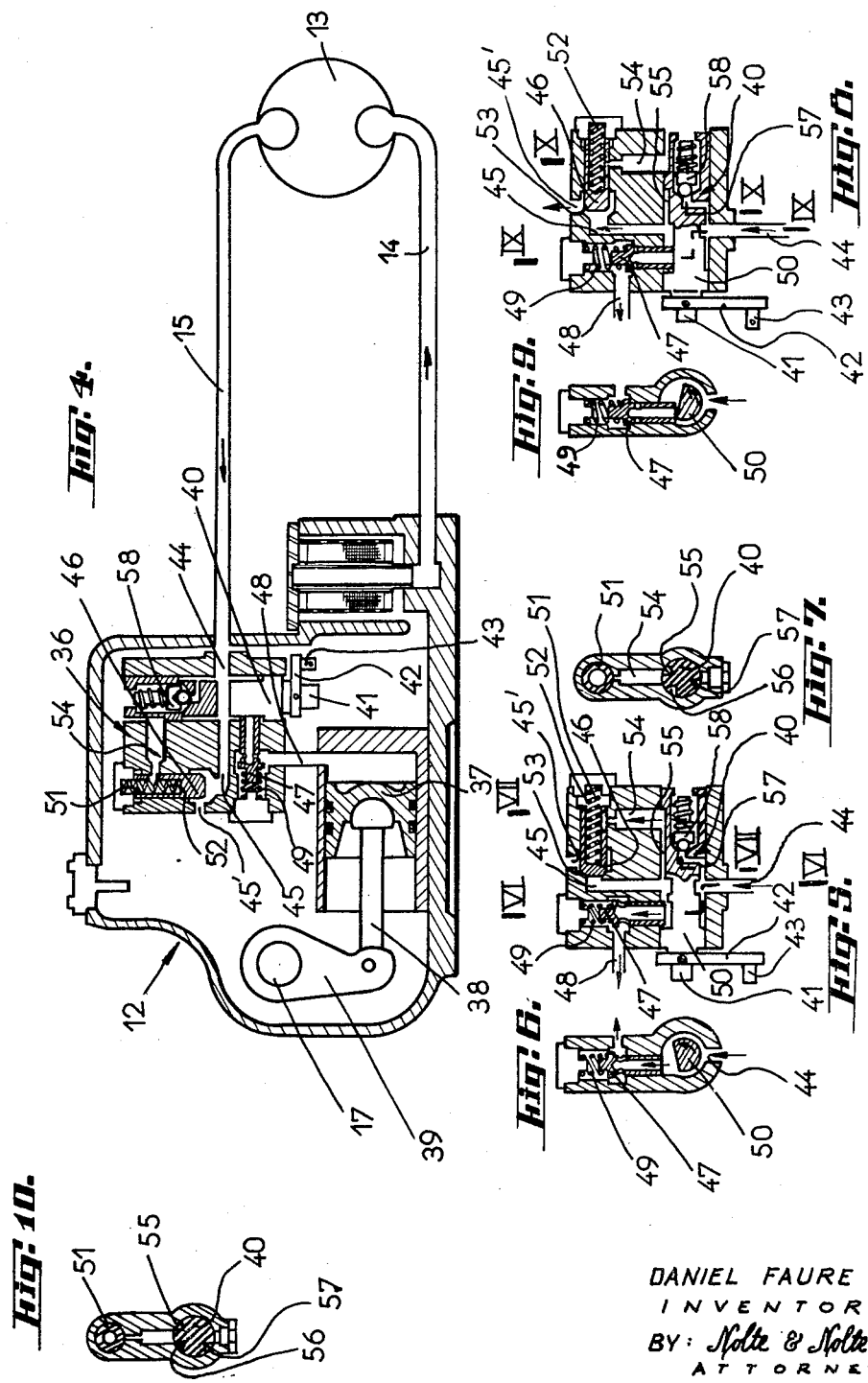

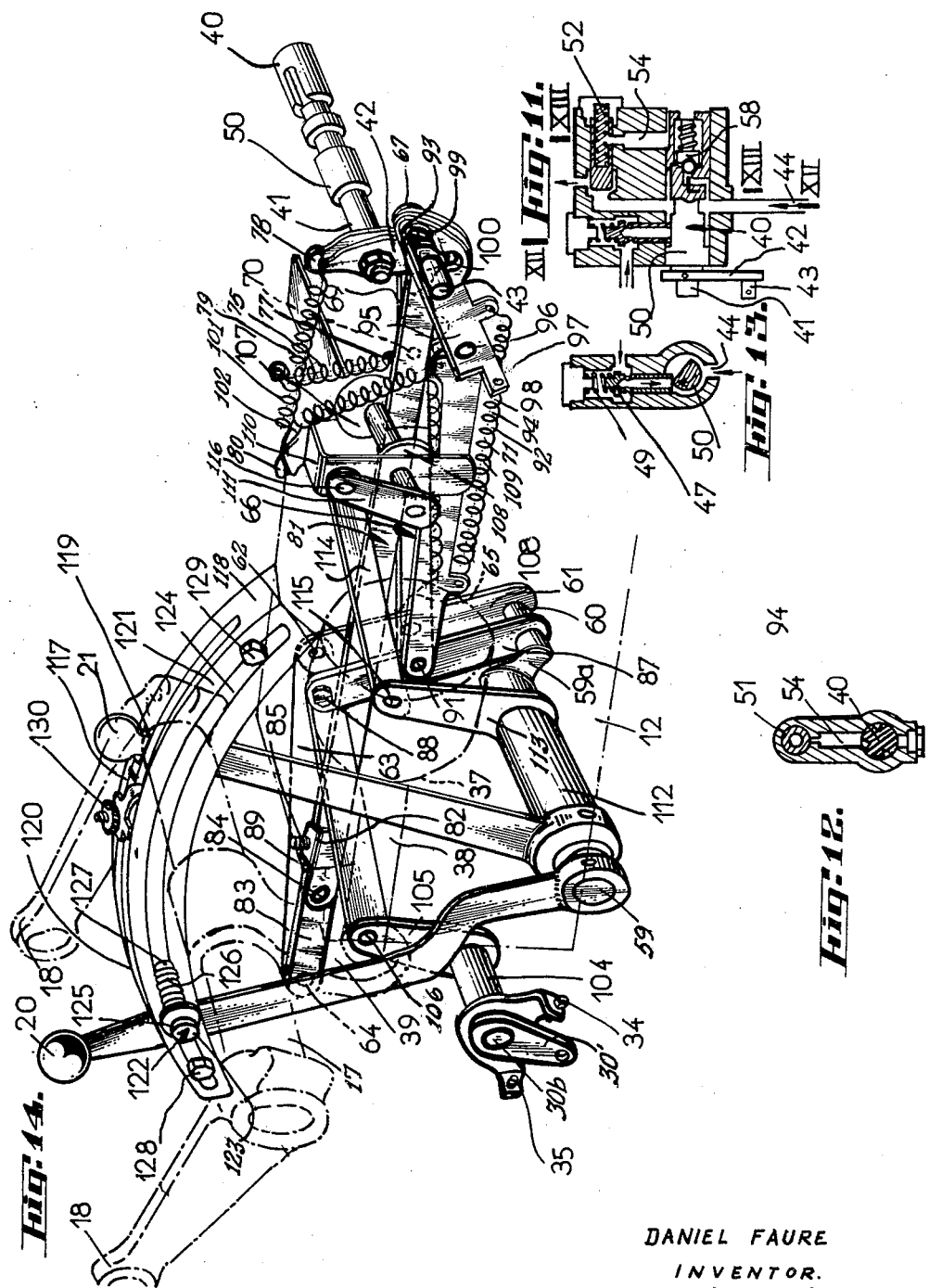

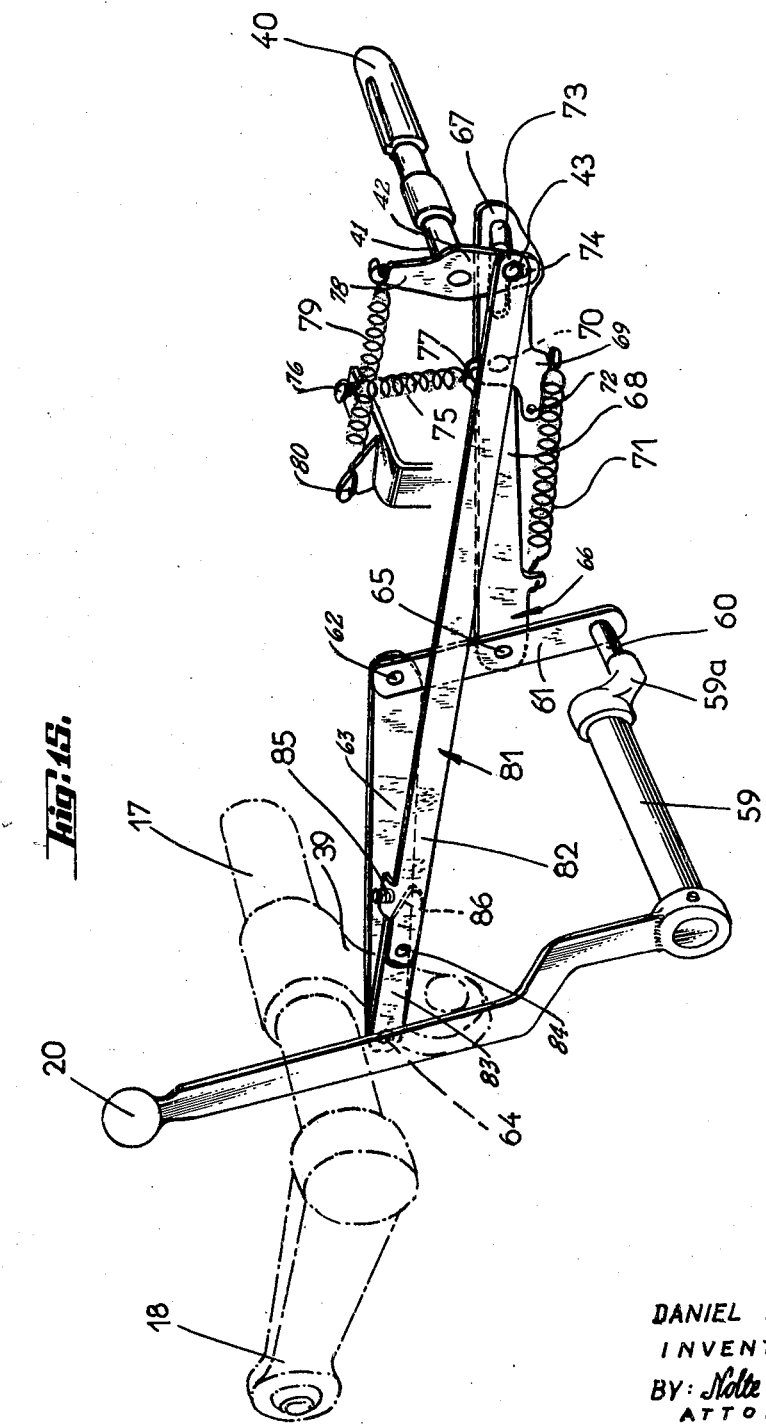

July 13, 1965    D. FAURE    3,194,319
SERVO-CONTROL DEVICE FOR RAISING TRACTOR-HAULED EQUIPMENT
Filed May 16, 1963    7 Sheets-Sheet 6

DANIEL FAURE
INVENTOR
BY: Nolte & Nolte
ATTORNEYS

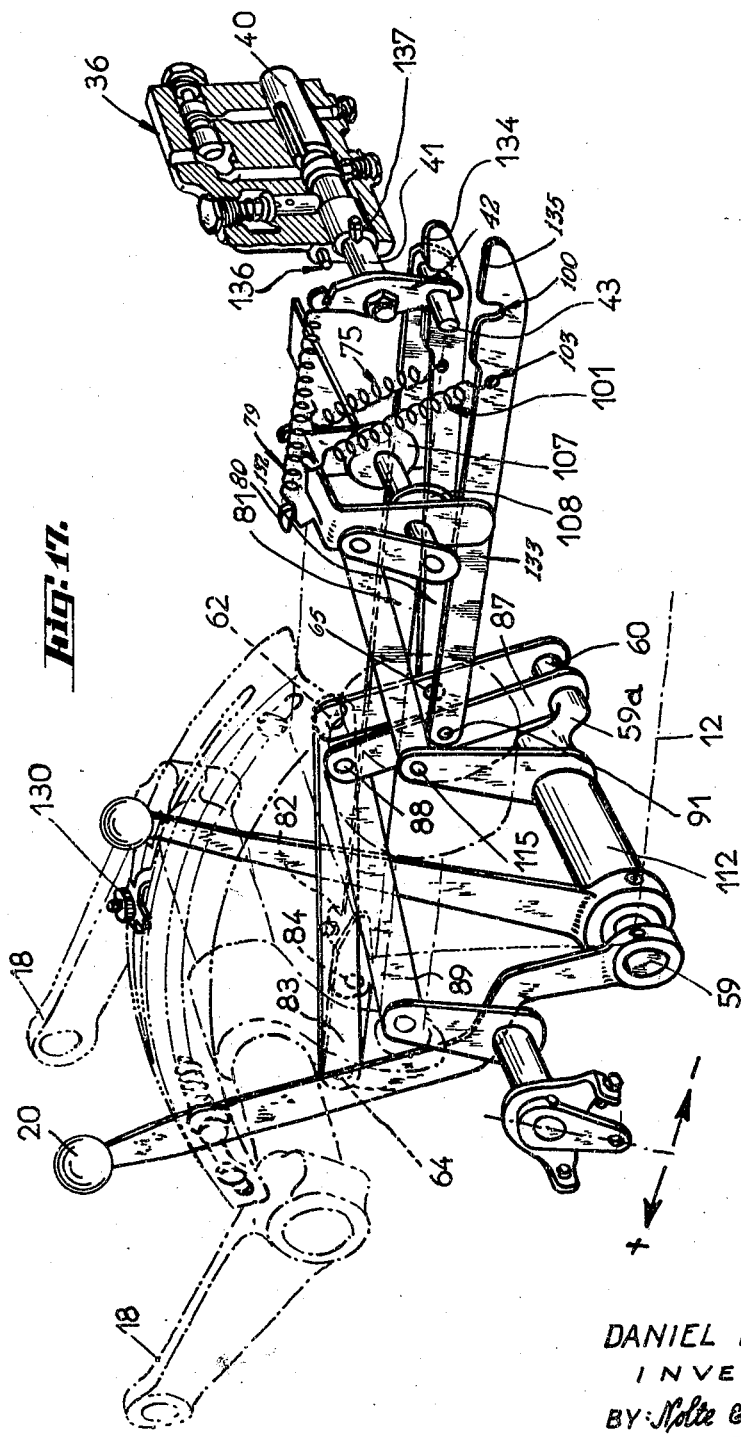

United States Patent Office 3,194,319
Patented July 13, 1965

3,194,319
SERVO-CONTROL DEVICE FOR RAISING
TRACTOR-HAULED EQUIPMENT
Daniel Faure, 17 Rue Paul Cazeneuve, Lyon, France
Filed May 16, 1963, Ser. No. 280,779
Claims priority, application France, May 25, 1962,
898,858
21 Claims. (Cl. 172—9)

This invention relates essentially to a device for controlling a servo-action mechanism as a function of two magnitudes such as the position of an element and the force exerted by this element, this device being applicable notably to equipments coupled to farming tractors or the like.

The device according to this invention is remarkable notably in that it constitutes a servo-action mechanism for example of the hydraulic servo-motor type energized from a pump for controlling the raising and lowering of a soil ploughing or like instrument coupled to a tractor automobile vehicle, for example of the farming type, by means of a so-called three-point coupling, of the type comprising a distributor of compressed fluid which is interposed preferably in the delivery circuit of said pump and comprises a control member in the form of a multiple-port three-position valve providing the feed or raising position, the stop or neutral position and the exhaust or lowering position, said valve monitoring said servo-motor consisting of a hydraulic single-acting cylinder adapted to be controlled separately at will through the medium of a selector device controlled in turn by means of a two-position hand-lever either by the position of said instrument or by the tractive effort exerted by said vehicle which is measured by a transmission device of said third-point coupling, said two magnitudes being stabilized respectively to an adjustable value set by the very position of a same control hand-lever and controllable at will by said last-named lever, this device being remarkable notably in that it comprises two transmission mechanisms of the linkage and positive drive type constituting two separate kinematic chains for the aforesaid two servo controls respectively, each chain connecting the aforesaid hand control lever to said valve, one of said transmission mechanisms being also connected to the shaft or lever controlling the raising arms, the other mechanism being also connected to the effort transmission device at said third point of said three-point coupling. These two parallel servo mechanisms of same design are thus positively connected through pivot pins housed in straps or tenons without resorting to any cam, roller or feeler or like costly friction elements likely, by their inherent inertia and play, to interfere with the precision and quickness of response of the control. Thus, the movements of the driven members take place positively in either direction.

The device according to this invention is characterized by an increased safety of operation due to the combination of the spring recovery effect introduced into the device in the raising direction, to the provision of a stroke-limiting rod acting directly on the valve, and to the evolutive connection between the two kinematic chains and said slide valve.

Other features and advantages of this invention will appear as the following description proceeds with reference to the accompanying drawings showing typical forms of embodiment of this invention given by way of example only, it being understood that the invention should not be construed as being limited to these specific examples since many modifications and variations may be brought thereto without departing from the scope of the invention as set forth in the appended claims. In the drawings:

FIGURE 2 is a perspective view showing on a larger scale, as seen from the rear, the three-point coupling and raising mechanism;

FIGURE 3 illustrates diagrammatically on a larger scale a side elevational view of the third-point connection mechanism;

FIGURE 4 illustrates diagrammatically a part-sectional view of the hydraulic circuit of the device according to this invention;

FIGURE 5 illustrates diagrammatically in section and on a smaller scale a hydraulic distributor having its component elements disposed in the "raising" position of the valve;

FIGURE 6 illustrates diagrammatically a section taken upon the line VI—VI of FIGURE 5;

FIGURE 7 illustrates diagrammatically a section taken upon the line VII—VII of FIGURE 5;

FIGURE 8 illustrates diagrammatically a sectional view of the distributor with its valve in neutral position;

FIGURE 9 illustrates diagrammatically a section taken upon the line IX—IX of FIGURE 8;

FIGURE 10 illustrates diagrammatically a section taken upon the line X—X of FIGURE 8;

FIGURE 11 illustrates diagrammatically a sectional view of the distributor with its valve in the "lowering" position;

FIGURE 12 illustrates diagrammatically a section taken upon the line XII—XII of FIGURE 11;

FIGURE 13 illustrates diagrammatically a section taken upon the line XIII—XIII of FIGURE 11;

FIGURE 14 illustrates diagrammatically in perspective view the complete servo-control device according to this invention;

FIGURE 15 illustrates separately and diagrammatically in perspective the position control servo-action kinematic chain;

FIGURE 17 illustrates diagrammatically in perspective a modified embodiment of the device shown in FIGURE 14.

Figure 1:
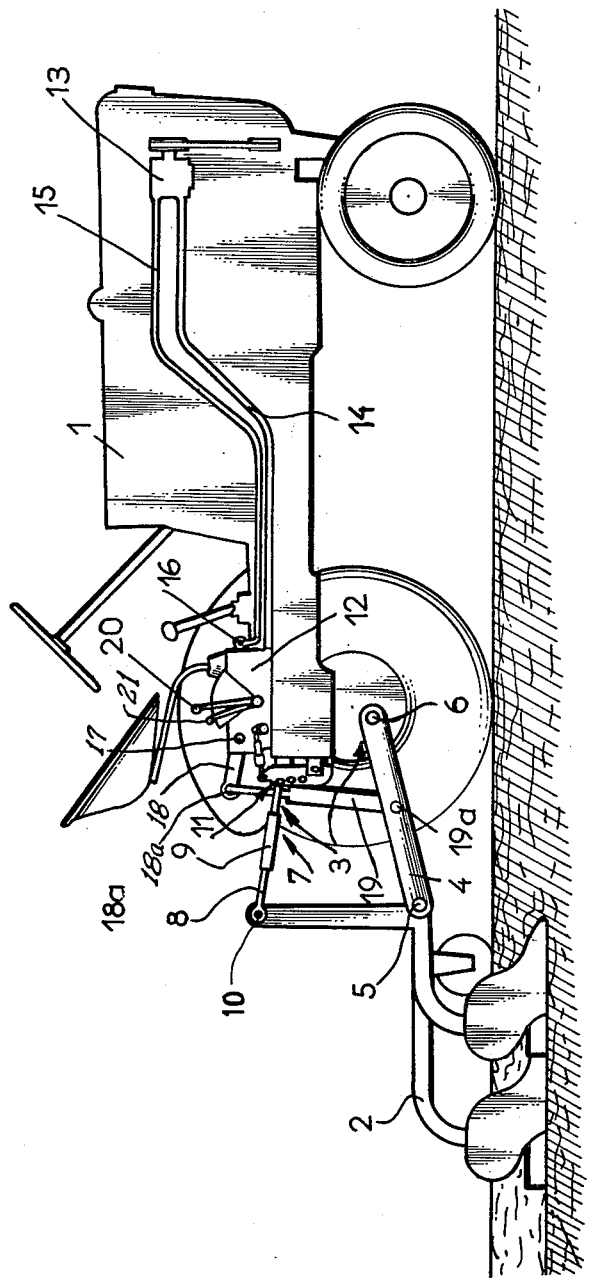
FIGURE 1 illustrates diagrammatically in side elevational view a farming tractor hauling a plough equipped with the control device of this invention.

In the specific and exemplary form of embodiment of the device which is shown in FIGURE 1, the reference numeral 1 designates a farming tractor to which an equipment or implement 2, for instance a plough, is attached by means of a conventional coupling or trailing hitch 3 of the so-called three-point type. This coupling comprises two side arms or draft links 4 having their rear ends pivoted on a horizontal shaft 5 or a pair of horizontal pivot pins 5a carried by the plough head and their front ends pivoted likewise on a horizontal shaft 6 carried by the tractor chassis, preferably substantially beneath the driving rear axle of the tractor.

A third point connection 7 comprises a rigid arm 8 consisting preferably of two sections assembled by a tensioning device 9 into a top link and pivoted at its rear end on a horizontal pin 10 disposed at a level substantially higher than the front end of the rigid arm 8 and carried by the upper end of the plough post, this front end of arm 8 being attached by means of a third-point coupling device 11, in a manner to be explained presently. Preferably, all these pivot pins or shafts are mounted in ball-and-socket or swivel bearings to afford a certain degree of free lateral motion for the instrument or equipment, the movements in the vertical plane being controlled by the raising device proper.

Mounted on the rear portion of the tractor is a raising control unit 12 bolted or otherwise secured on the frame of the tractor and comprising a built-in oil sump or reservoir. This unit communicates with a hydraulic pump 13 secured on the power unit and driven from the tractor motor either through a belt from a power take-off or the timing pinions of the motor, or through any other means at any suitable point on the tractor. This pump draws oil from the unit 12 through a suction pipe line 14 and delivers it through a pipe line or transmission line 15 to a union or like fitting 16 carried by the raising unit.

This unit 12 also carries by means a common rotating or rock shaft 17 the two-ball-coupling or swivel raising (lift) arms 18 having their rear ends 18a pivoted on corresponding suspension arms or drop links 19 preferably of the adjustable-length type which connect the arms 18 to the relevant coupling rods 4, the suspension arms 19 being pivotally connected to these rods at an intermediate point 19a thereof (see FIGURE 2). The servo-action mechanism is controlled by a hand-lever 20 and the selection from the effort-responsive control to the position-responsive control or vice-versa is effected by means of a selector or change-over lever 21.

The third-point coupling device 11 (see FIGURES 3) comprises a movable support in the form of a strap or yoke (rocker member) 22 pivotally mounted on a substantially horizontal pin or lug 23 consisting preferably of a horizontal spindle carried for example by a lug or boss projecting from a gear-change transmission case 24 of the tractor. Several superposed pairs of aligned holes (for example three pairs, 25, 26 and 27) are formed through this strap 22 for adjustably coupling the arm 8 to the strap by means of a detachable spindle 8a. The front face of strap 22 contacts a pair of elastic pads 28, 29 disposed on either side respectively (that is, above and beneath) of the horizontal pin 23 and pre-stressed in the assembled condition.

When the instrument or tool 2 is pulled by the tractor 1 the side arms 4 are subjected to a tractive effort while the upper arm 8 is compression stressed to resist the tendency of the instrument 2 to tilt upward about the axis 5. When the tool is relatively heavy and the load applied thereto during its operation is relatively moderate, the upper arm 8 may also be subjected to a tractive effort due to the predominance of the weight of the tool of which the overhang effect is not sufficient to balance the preceding tilting moment. When the upper arm 8 is compression-stressed, it compresses in turn the elastic pad 28 and at the same time the effort applied to the other pad 29 is reduced and may even be cancelled or reversed. Thus, to any compressive or tractive effort applied to the arm 8 there corresponds a single position of the third-point strap 22. If the upper arm 8 is attached by inserting the spindle 8a through the lowermost pair of holes 27 which is nearest to the horizontal pivot 23, a very considerable reaction will be necessary to compress the pad 28.

On the other hand, an effort of same magnitude will compress this pad to a greater extent if the spindle 8a is inserted through the intermediate pair of aligned holes 26, and to a still greater extent if the spindle is inserted through the uppermost pair of holes 25 which is remotest from the pivot 23, for as the point of application of the effort exerted by the arm 8 is moved away from the axis of rotation of strap 22, the lever arm increases. Under these conditions, it is clear that the higher the position of assembly spindle 8a, the greater the sensitivity of the coupling to tractive efforts. Thus, under normal operating conditions it will be advisable to use the upper holes 25 for surface and light works, the lower holes 27 for heavy works, that is, when a major sensitivity is not required or when the soil is of heterogeneous character, the central holes 26 being used for example for performing works in a controlled position.

The swinging movements of straps 22 are transmitted to an input lever 30 through the medium of an adjustable connecting link or control member 31 having one end pivoted at 30a on said input lever and the other end pivoted on the upper portion 31a of strap 22. The input lever 30 is solid with a shaft 104 connected to the effort-responsive control mechanism or kinematic chain. The link 31 may of course be replaced by any other suitable device as a cable transmission, a hydraulic transmission, or the like.

The beat or oscillation of strap 22 is limited in either direction by a pair of adjustable stops 32, 33 limiting the compression of the elastic pads 28, 29 in order to determine the maximum value of the strap oscillation and therefore of the tractive and compressive efforts applied to the third-point rod 8. The relative swinging of lever 30 is also limited by a pair of adjustable stops 34, 35 so disposed that the maximum angular amplitude of lever 30 between stops 34 and 35 corresponds substantially to the maximum permissible angular beat of strap 22.

This third-point coupling system is already known per se and has been described herein for explanatory purposes only and should not be construed as limiting the present invention, as other equivalent means may be used with corresponding effects.

As will be explained presently, to any position of the lowering and raising control lever 20 there corresponds a single position of the input lever 30 at which the valve member of the internal distributor of unit 12 assumes a neutral position while stopping the operation of the raising mechanism. From these relative positions of equilibrium any displacement in any direction will produce a servo-action tending to restore the initial equilibrium. Thus, when the soil portion engaged by tool or instrument 2 is less running than the preceding one the compression stresses applied to the upper arm 8 increases and the third-point strap 22 is tilted forwards to move the input lever 30. Thus the internal servo-action becomes operative to raise the arms 18 and therefore the tool 2 in order to reduce its depth of penetration and therefore its resistance to forward motion. This movement will cease when the compression effort exetred on arm 8 has resumed its initial value.

The purpose of the effort control device is essentially to maintain to a constant value set by the actual position of lever 30 the effort demanded to the tractor both in a soil having variable characteristics and when reactions are produced in the coupling system as a consequence of the tractor movements due to the clearing of ground unevennesses, whether of natural or artificial character, by the tractor wheels or tracks.

FIGURE 4 illustrates a typical diagram of the hydraulic circuit, showing in section the tool raising unit 12 comprising in a common case or housing constituting an integral oil sump or reservoir a hydraulic distributor or control mechanism 36 and a single-acting hydraulic cylinder or ram unit 37 controlling through a swivel or ball-and-socket-type link (piston rod) 38 a fork or socket lever, or drive arm 39 rigid with the raising shaft 17. The case of unit 12 encloses on the other hand the servo-action mechanisms.

The hydraulic distributor 36 deriving for example from a known type used notably in load-transfer hydraulic systems, comprises a single three-way rotary valve member or plug 40 of which a control shaft 41 carries externally a crank web 42 adapted to be connected directly through a crankpin 43 to either of the two servo-action mechanisms or kinematic chains. The valve member 40 provides a constant communication between a pressure-oil inlet or intake port 44 connected to the pump delivery pipe line 15 and on the one hand an exhaust or return port 45 leading to the reservoir or sump, which is adapted to be closed by an exhaust valve comprising a piston 46, and on the other hand a feed and relief spring-loaded check valve 47 inserted in a feed and return circuit or duct 48 connecting the distributor to the cylinder.

This last-named valve 47 (acting also as a non-return valve) is normally urged by a spring 49 and the oil pressure in the cylinder to its closed position, but it can be opened mechanically by the rotary valve member 40 in a predetermined position thereof, by means of a cam or like member 50 solid with the rotary valve member and registering with said valve 47 engageable by said cam or the like. The piston 46 acting as an exhaust valve is slidably mounted in a chamber 51 of the distributor body and responsive to the permanent action of a return spring 52 urging said piston to its closed position in which it engages a frustoconical or like seat 53 to close the exhaust port 45. The rear face of piston 46, together with chamber 51, may be put in fluid connection with the inlet port 44 by means of the rotary valve member 40 at a certain position thereof, by means of a duct 54 formed in the distributor body and leading into the chamber 51 and also of a passage groove or duct 55 formed in said rotary valve member and adapted to register with the duct 54.

In another valve member position the chamber 51 may also be connected to the oil sump through another passage groove or duct 56 to permit the escape of the oil contained in this chamber 51. Finally, the rotary valve member 40 is also formed with an exhaust duct 57 constantly communicating with the inlet port 44 and normally closed by a safety or overload relief valve 58 leading controlling the access to the oil sump. The passage 57 has on the other hand the function of balancing the rotary valve member in the radial direction since this passage 57 opens through the peripheral valve surface, preferably at a point diametrically opposed to groove 55, thus easing the operation of the valve member and reducing friction wear.

As already stated, the rotary valve member 40 of the distributor may be set in three positions, namely a neutral or inoperative position in which the cylinder piston is kept in its momentary position by the fluid under pressure, and two positions, that is, a raising or cylinder-feed position and a lowering or cylinder-exhaust position, these positions being located on either side of the neutral position. A very small angular movement of the rotary valve member on either side of its neutral position will cause fluid under pressure to be delivered to, or exhausted from, the hydraulic cylinder. In the tool-raising control position illustrated in FIGURES 5 to 7 of the drawings cam 50 is moved away from valve 47 and the passage groove 55 registers with duct 54, whereby oil under pressure flows into chamber 51 and, due to the combined action of the oil under pressure and of return spring 52, piston 56 is urged against its conical seat 53; since in this case the cross-sectional area of the free front face of piston 46 in exhaust duct 45 is smaller than that of the rear face of this piston, when the oil pressure increases in the distributor ducts this piston 46 will remain in its closed position due to the direction of the resultant of the hydraulic forces thus set up. Due to this increasing oil pressure, the valve 47 is moved back and oil under pressure flows into cylinder 37.

In the neutral or stop position illustrated in FIGURES 8 to 10 of the drawings the communication between chamber 51 and the inlet port 44 is discontinued and this chamber is connected to the exhaust through the groove 45 now registering with duct 54. The oil trapped in chamber 51 will thus escape to the sump and piston 46, due to the hydraulic pressure applied to its front face, will recede, thus uncovering an outlet port 45' of exhaust duct 45 to the sump. Valve 47 is reclosed by its return spring 49 and by the oil pressure in the cylinder. At this time, the cam 50 of rotary valve member 40 just contacts—without any appreciable pressure—the valve 47 which may be of the mushroom or poppet type.

In the lowering control position illustrated in FIGURES 11 to 13, the chamber 51 is constantly connected to the exhaust through groove 56 and due to the complementary rotation of the rotary valve the cam 50 lifts valve 47, thus causing the duct 48 of the cylinder to communicate with the exhaust duct 45 in which the exhaust control piston 46 is easily pushed upwards, so that a corresponding pressure drop takes place.

FIGURE 14 illustrates the complete double servo-action mechanism connecting the rotary valve 40 of the distributor respectively to the raising lever 39 on the first hand and to the third-point coupling device on the other hand, and to the hand control lever 20, together with the selector system.

FIGURE 15 shows the kinematic chain or mechanism responsive to the controlled position. The hand control lever 20 is mounted on a rotary plain shaft 59 mounted preferably horizontally in a bearing of the raising unit 12, this shaft 59 comprising a crank web 59a having journalled on a crankpin 60 the lower end of a rocking lever or link member 61 adapted to oscillate preferably in a vertical plane, for example a plane parallel to the longitudinal vertical plane of the vehicle. The upper end of rocking lever 61 is pivoted by means of a pin 62 on a follow-up link 63 connecting the lever 61 to the raising lever 39 on which the link 63 has its opposite end pivoted by means of a pin 64 rigid with lever 39, as shown. Elements 63, 61 and 66 together form what may be termed a first linkage.

The rocking lever 61 is pivotally connected intermediate its ends, at 65, to one end of a variable compound connecting-rod or force-transmitting link 66, preferably of the elastically deformable type, the opposite end 67 of this rod 66 being connected to the crankpin 43 of crankweb 42 solid with the rotary valve 40. This crankpin 43 consists for instance of a stub shaft extending at right angles through the crank-web 42 so that it projects on either side of this web 42. The deformable connecting-rod 66 is deformable in only one and single direction from its initial or rectilinear state, and consists preferably of two movable arms, portions or sections 68, 69 pivoted on each other at a point 70 and constantly urged by elastic means such as a spring or like element 71 having its ends attached to these arms 68, 69 to their mutually aligned position, that is, the position in which they are substantially co-extensive. This aligned position is determined by a stop or abutment 72 solid with one of the arms, for instance arm 69, and adapted to engage in the aligned position the lower edge of the other arm 68. Thus, due to the provision of this stop 72 the compound connecting rod 66 can be folded in one direction only and in this example this direction is the downward direction as far as pivot pin 70 is concerned. The two arms may advantageously have different lengths, the arm 69 connected to the rotary valve 40 being preferably shorter than the other arm 68 so as to constitute somewhat a kind of pivoted extension thereof. One of the two arms, preferably arm 68 connected to rocker 61, is adapted to cooperate with a corresponding member of the aforesaid selector system. The other arm 69 is connected to the crankpin 43 of the rotary valve crankweb by means of an elongated hole or like aperture formed in the end portion 67 of connecting-rod 69 and engaged by said crankpin, the contour of this slot being designed with a view to permit, according to its relative position, the engagement or the disengagement of the operative connection with said crankpin under the combined effect of the controlled action exerted by the selector system and of the attendant deformation of the compound connecting-rod 66.

Preferably, the aforesaid elongated hole or like aperture is substantially T-shaped, its upper transverse portion constituting a substantially rectilinear elongated aperture, slot or slideway 73 substantially parallel to the longitudinal axis of arm 69. This slideway is adapted, in its released position, that is, when the crankpin 43 is engaged therein, to permit the mutually inoperative movements of combined translation and rotation of crankweb 42 and arm 69. The other portion of the T-shaped aperture, which extends substantially at right angles to the slideway 73, consists of an elongated blind groove 74 preferably substantially rectilinear and constituting a kind of hollowed or engaged transverse notch permitting only the relative angular movement of crankweb 42 and arm 69 when the crankpin 43 engages the bottom of groove 74.

A preferably resilient member, such as at least one drawback spring 75 or the like, is provided for constantly urging the connecting-rod 66 (by acting preferably on its arm 68) on the one hand in the direction to engage the crankpin 43 into the aforesaid blind groove 74 and on the other hand toward the position in which it is operatively connected with the aforesaid selector system. The spring 75 which, in the present instance, is a tension spring, is attached for example by one end to a fixed point (lug) 76 and by its other end to a point 77 of arm 68, preferably in the vicinity of the pivot pin 70. The crankweb 42 is advantageously provided, beyond the shaft 41 of rotary valve 40, with an extension 78 responsive to a play take-up spring 79 having its other end attached to a fixed point or bracket 80. This spring 79, preferably of the tension type, is thus caused to constantly urge the crankweb 42 in the direction to rotate the rotary valve 40 counterclockwise, as seen in the FIGURE, that is, in the direction to lift the raising arms 18.

An adjustable deformable rod (pull rod) 81 connects the raising lever 39 to the crankpin 43 of rotary valve 40. To this end, this rod has one end pivoted on said crankpin and the other end pivoted preferably on the pivot pin 64 on which the aforesaid link 63 is also pivoted. This deformable rod 81 is deformable only in one direction from an initial condition of maximum adjustable elongation, and consists advantageously of two movable sections or arms 82, 83, if desired also of unequal lengths, which are pivoted on each other at an intermediate point 84. An adjustable stop 85 for example of the screw type is provided on one of these arms, for example arm 82, for determining the initial position of maximum relative spacing of the two arms which sets the distance between centers of, or the maximum permissible relative spacing between the crankpins 64 of the raising lever and 43 of the rotary valve. To this end, a stop 85 is adapted to engage a portion 86 of arm 83, thus permitting the possible bending of rod 81 only in the downward direction of movement of pivot pin 84 which, to this end, lies below the plane containing the axes of the two crankpins 64 and 43.

Figure 16:
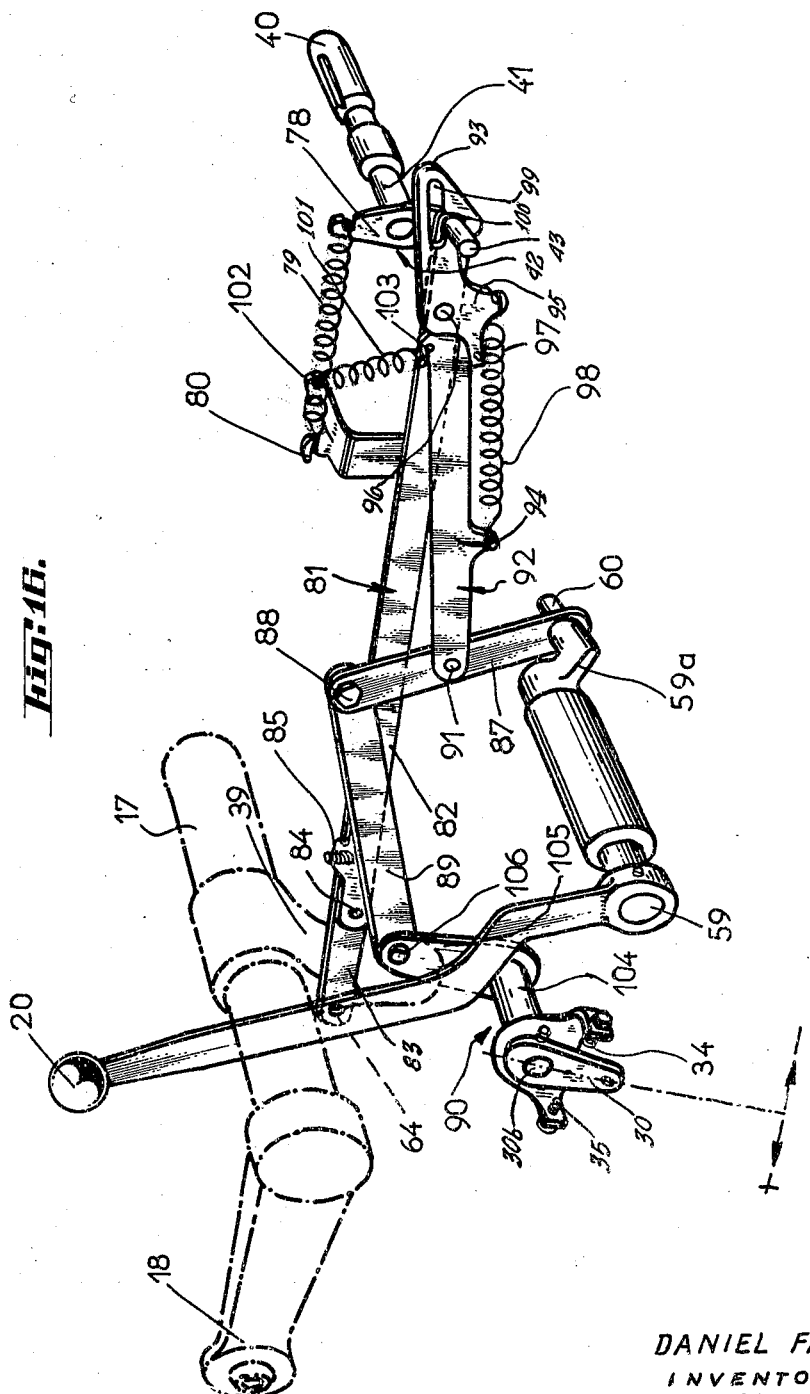
FIGURE 16 illustrates separately and diagrammatically in perspective the effort control servo-action kinematic chain.

FIGURE 16 illustrates the kinematic chain or mechanism servo-responsive to the controlled effort, wherein the displacement occurs likewise preferably in a substantially vertical plane parallel to that of the preceding chain. The component elements of this chain which connect the crank-web 59a rigid with the hand control lever 20 to the crank-web 42 of rotary valve 40 are advantageously completely similar if not identical, from the organic and functional point of view, with the corresponding or homologous elements of the servo-action chain of FIGURE 15. The chain illustrated in FIGURE 16 comprises similarly a rocking lever or link member 87 having its lower end pivoted on the same crank-pin 60 of crank web 59a of hand control lever 20, whereby this crank-pin 60 is common to both servo-action chains.

The upper end of this rocking lever 87 is connected through a pivot pin 88 to a follow-up link 89 connecting in turn the rocker 87 to the transmission device of a third-point coupling 90. The rocker 87 is pivoted intermediate its ends, at point 91, on one end of a deformable connecting-rod or force-transmitting link 92 having its other end 93 connected to the crank-pin 43 of the rotary valve crank-web 42. This crank-pin 43 is thus also known to the two servo-action chains, since it is connected to the two deformable connecting-rods 66 and 92 of these two chains and also to the deformable rod 81. The two ends of the two deformable connecting-rods 66 and 92 are mounted for example on the ends of crank-pin 43 which extend on either side of crank-web 42. Elements 89, 87 and 92 may, in turn, be termed a second linkage.

The deformable connecting-rod 92 is also comprised, like rod 66, of two arms or portions 94, 95 pivoted on each other at a pin 96 and adapted to be folded in only one direction, that is, the direction of the downward movement of pivot pin 96, due to the provision of a stop or abutment 97 carried for instance by the arm 95 and adapted to engage the lower edge of arm 94 when these two arms have resumed their initial, substantially aligned relative position in which they are co-extensive. A tension or like spring 98 having its ends attached to the two arms 94, 95 constantly urges these arms to their aforesaid aligned position.

The arm 95, which is advantageously shorter than arm 94, is also provided at its end 93 with a slot engaged by the crank-pin 43 carried by the rotary valve crank-web 42, this slot consisting on the one hand of a longitudinal slot or slideway 99 and on the other hand of a blind groove 100 opening into said slideway and extending substantially at right angles thereto. Connecting-rod 92, also adapted to co-operate with a corresponding member of the aforesaid selector system, is responsive to the permanent load of a traction or like spring 101 attached by one end to a fixed point (lug) 102 by its opposite end to a point 103 of connecting-rod 92, preferably on the arm 94 and in the vicinity of the pivot pin 96 thereof.

The pivot pin 88 connecting the link 89 and rocker 87 consists advantageously of a device acting like an adjustable eccentric adapted to determine the amplitude of the permissible relative angular movement between link 89 and rocker 87.

The transmission device 90 of the third-point coupling comprises a crankshaft or like rotary member 104 incorporating two crank-webs or arms 30' and 105 so as to form a bell-crank lever. Crank-web 30' constitutes or is solid with the aforesaid input lever 30, and the other crank-web 105 is pivoted by its end 106 on the end of the aforesaid link 89. The crank-web 30' is displaceable between the aforesaid limit stops 34 and 35, one stop 34 corresponding to the minimum effort and the other 35 to the maximum effort. It may be noted that in FIGURES 14 and 16 the relative positions of crank-web 30' and stop members 34, 35 are reversed respectively in relation to those of the input lever 30 and stops 34 and 35 illustrated in FIGURES 1 to 3 of the drawings.

In fact, the form of embodiment shown in FIGURES 14 and 16 may correspond to at least two different variations both applicable differently. In a first variation, the input lever 30 would have the position illustrated in FIGURES 1 to 3 (that is, directed upwardly) and would be rigid with crank-web 30' directed downwardly, so that the latter would act simply as a movable counter-stop adapted to engage the adjustable stationary stops 34 and 35. In the other variation the input lever 30 consists of the crank-web 30' pivoted by its lower end on the adjustable connecting link 31, and the pivot pin 26 of upper arm 9 is assumed to lie beneath the pivot pin 23 of strap 22, that is, on the side opposed, with respect to this pin 23, to that of the pivot pin 31a of link 31 (see FIGURE 3).

The selector or change-over system designed for putting into operation one of the servo-action chains or mechanisms while simultaneously rendering the other servo-action chain or mechanism inoperative, and vice versa, is illustrated in FIGURE 14 showing the complete assembly of the two servo-action mechanisms or chains. This selector system comprises a pair of cams or like disconnecting members 107, 108 mounted on a common cam shaft or tumbling shaft 109 controlled by the aforesaid selector lever disposed preferably in a horizontal position and carried by stationary bearings or supports 110.

In case the two rocking levers 61 and 87 were identical, as well as the two deformable compound connecting-rods 66 and 92, the two cams 107 and 108 will advantageously also have the same shapes and dimensions, and will overlie said two connecting-rods 66, 92 so as to engage either of them, for example their respective arms 68 and 94, in order to lower the arm contemplated and thus fold each one of these deformable connecting-rods about their intermediate pivot pin 70 and 96. To this end, the aforesaid cams are designed to have an evolutive contour and such a relative mutual direction that when one of said cams causes its companion connecting-rod to be deflected downwards, the other cam permits the expansion or straightening of the relevant connecting-rod, whereby the latter can resume a rectilinear configuration under the influence of its return spring 71 to 98.

When one of these deformable connecting-rods is thus folded downwards by its companion cam its short arm 69 or 95 is caused, in this broken configuration of the connecting-rod, to assume a disengaged or released connection position with respect to the crank-pin 43 of rotary valve crank-web 42, wherein this crank-pin engages the slideway 99, and on the other hand when the connecting-rod resumes its aligned configuration it is ready to be engaged by the crank-pin 43 which, in a suitable position, is likely to be moved to the bottom of the substantially vertical groove 74 or 100 under the influence of the return spring 75 or 101.

The contour of cams 107 and 108 is so designed that when the selector control lever passes at a predetermined intermediate position, both deformable connecting-rods 66 and 92 are bent simultaneously to a transient folded position in which their connection with crank-pin 43 is acted upon, whereby this crank-pin 43 is engaged in both slideways 73 and 99 simultaneously.

The cam shaft 109 may be rotatably driven from a crank lever 111 solid with one end of this shaft and having its other end pivotally connected to the selector lever 21. To this end, the selector lever 21 is solid with a preferably tubular (hollow) rotary shaft 112 mounted coaxially on shaft 59 of hand control lever 20. The tubular shaft 112 incorporates a crank-web 113 connected to crank lever 111 through a link 114 pivoted at 115 on the crank-web 113 and at 116 on crank-web 111, as shown. The operative connection between shafts 109 and 112 may of course be effected through any other suitable means, for example through gears.

The selector control lever 21 is displaceable in a guide groove or slot 117 formed in a circular sector 118 providing a fixed positioning thereof. This guide groove 117 comprises at either end two notches or gabs 119, 120 corresponding to the possible positions of the selector control lever 21, the latter being engageable in these notches and retained therein by its inherent resiliency.

The tool raising control lever 20 is displaceable against a vertical or like area 121 provided preferably on the same positioning sector 118.

This lever 20 comprises a clamping device 122 for automatically holding this lever against motion in each one of its positions by simple frictional engagement. To this end, this device 122 is advantageously of the resilient clamping type consisting for example of a screw or like member 123 adapted to move bodily with the lever 20 (on which it is secured) in an arcuated groove or slot 124 formed in a side flange of sector 118. Threaded on this screw 123 are a washer 125 and a coil compression spring 126 retained by a nut 127 screwed on the screw end. The purpose of the spring and washer assembly is to resiliently press the lever 20 against the edge or flange of sector 118 in order to produce a frictional force sufficient to hold the lever 20 against motion, in spite of any parasitic forces likely to be exerted thereon.

The permissible angular stroke of control lever along sector 118 may be limited in either direction by at least two limit stops 128, 129 of which at least one, preferably stop 128, is adjustable along the sector 118. The other stop 129, which if desired may also be of the adjustable type, may be used for determining the lowermost position of instrument 2, and an additional movable reference mark 130 may be provided for indicating a predetermined intermediate position.

The control lever sector 118 is preferably so disposed that the level of its left-hand or rear end (as seen in FIGURE 14) is higher than that of its right-hand or front end, whereby the uppermost left-hand portion of the sector will correspond to the maximum raised position of the raising arms 18 and the lowermost right-hand portion will correspond to the maximum lowered position.

The selector system operates as follows: when the operator wishes to switch for example to a controlled-position servo-action operation, he moves the selector control lever 21 to the position shown in FIGURE 14, so that the lever engages the notch 119 in groove 117 of sector 118. Assuming that this lever movement occurred from its extreme left-hand position as defined by notch 120, both cams 107, 108, at the time the lever 21 has accomplished approximately half the path from notch 120 to notch 119, will have depressed the arm 94 of deformable connecting-rod 92 so as to bend the latter while simultaneously moving away from the arm 68 of connecting-rod 66, whereby the spring 71 associated with this connecting-rod 66 will straighten the latter.

The rotary valve crank-pin 43 is thus disengaged from the two slots 74 and 100 of arms 69 and 95 of the aforesaid deformable connecting-rods 66 and 92 respectively, and engages the slideways 73 and 99 thereof, thereby enabling the rotary valve member 40 to rotate in the counterclockwise direction under the influence of the play take-up spring 79, since the crank-pin 43 is displaceable relatively freely in said slideways. This rotation moves the rotary valve member 40 to the position controlling the lifting of the raising arms 18. Of course, this rotary movement of valve member 40 under the influence of spring 79 is permitted only if the so-called limit rod 81 is initially folded downwards.

When this movement is completed the operator has completed on the other hand the movement of the selector control lever 21 which now engages the end notch 119. Thus, cam 108 completes the lowering of arm 94 of deformable connecting-rod 92, whereby the upper edge of slideway 99 engages the upper face of crank-pin 43 and the latter can thus move freely in slideway 99 while causing the arm 95 to pivot slightly, if need be. On the other hand, the cam 107 has moved considerably away from the upper face of arm 68 of connecting-rod 66 to permit a subsequent free movement. The upward movement of the raising arms is stopped (unless it was already stopped initially) at the end of the stroke due to the action of rod 81 which, by acting at the end of the straightening movement upon the crank pin 43 of web 42, restores the rotary valve 40 to its neutral position.

When the operator subsequently restores the hand lever 20 against the stop 128 corresponding to the maximum upward stroke, the servo-action kinematic chain or mechanism will place the axis of symmetry of the nearly vertical groove 74 substantially above the crank-pin 43 and spring 75 will then lift the deformable connecting-rod 66 until this pin 43 is engaged home in said groove 74. In this position the servo-action chain responsive to the controlled position is rendered operative or engaged while the other servo-action chain responsive to the controlled effort is rendered inoperative or disengaged.

As a result of this general arrangement the position-responsive servo-action chain can easily be engaged when the raising arms complete their raising stroke. If desired, this engagement can be obtained by raising manually the previously unloaded raising arms 18. In case of mishandling or misoperation on an area for packing bare blocks, the servo-action mechanism can still be easily re-engaged irrespective of the present movements or positions of the arms 18, hand lever 20, input lever 30 and selector control lever 21 by actuating only these controls until a characteristic slap is heard, and thus any disassembling of parts is definitely precluded.

When the selector control lever 21 is in the position shown in FIGURE 14 the position-responsive servo-action operates as follows:

The spring 75 lifts connecting-rod 66 to its straight position spaced from cam 107 so that the crank-pin 43 of rotary valve 40 remains in the bottom of the substantially vertical groove 74. The different components of the kinematic chain governing the position control are then engaged or in operative shape, and those of the effort control are disengaged or in inoperative shape, and crank-pin 43 can move freely in the slot 99 of connecting-rod 92 held in its downwardly bent position by cam 108. The pivot pin 70 between the arms 68 and 69 of rod 66 cannot function in the direction of the upward movement due to the presence of the stop-forming stud 72 urged by spring 71 against the lower edge of arm 68. Thus, the connecting rod 66 may under these conditions be assimilated to a rigid rod as far as the movements to the left or right-hand side of the figure are concerned. On the other hand, this rod 66 can bend during a downward movement.

If the operator wishes to control a downward movement of arms 18, he moves the hand control lever 20 to the right or to the front end of sector 118, that is, to the lower portion thereof (FIGURE 14). This lever 20 is then retained or locked automatically by the device 122. During this left-to-right movement of control lever 20 the crank-web 59a of this lever rotates in the clockwise direction (FIGURE 14) and carries along the lower end of rocker 61 so that the latter rotates about the pin 62 and moves in turn the rod 66 to the left, together with the valve member crank-pin 43 engaged in the vertical groove 74. Thus, the rotary valve 40 is moved to the position controlling the downward movement and as a consequence of the resulting downward movement of arms 18 the raising lever 39 pushes the link 63 and therefore the pivot pin 62 at the upper end of rocker 61 to the right.

Since the crank-pin 60 of crank-web 59a solid with control lever 20 is held against movement by a friction clamping device 122, the rocker 61 will pivot in the clockwise direction (FIGURE 14) about the crank-pin 60, thus moving the connecting-rod 66 and therefore the crank-web 42 of rotary valve 40 of distributor unit 12 to the right, until this rotary valve 40 is in neutral position and stops the downward movement of arms 18 and therefore the rotation of raising lever 39, whereby this lever 39 is held in a position corresponding to that of control lever 20. It is clear that under these conditions the more the control lever 20 is moved toward the lower end of the sector, the greater the rotation of valve member 40 toward the "lowering" position. Therefore, a longer stroke of the servo-action mechanism connected to lever 39 will be required to restore the valve member 40 to its neutral position.

If the operator wishes to control an upward movement of the raising arms 18, he moves the lever 20 to the left or to the rear of sector 118 (that is, toward the top of this sector as seen in FIGURE 14). The servo-action mechanism operates under the same conditions but in the opposite direction to restore the rotary valve member 40 to its neutral position, and finally the complete system to a position corresponding to the present position of control lever 20. Thus, to each position of control lever 20 there corresponds a position of arms 18. This applies to all the positions of lever 20 except the maximum raising position in which the movement is stopped by means of the deformable connecting-rod 81. In fact, the arms 82 and 83 of this rod can pivot about the pivot pin 84 only in one direction from the maximum divaricated position, that is, downwardly, for its movement in the opposite direction is limited by the adjustable screw stop 85, thereby limiting the angle formed by arms 82 and 83 and therefore the relative spacing of crank-pins 64 and 43.

Thus, the stop position at the end of the raising stroke can be adjusted by simply moving the control lever 20 to the endmost left-hand position or to the rear of sector 118 which corresponds in practice to its top, and to act upon the stop screw 85 with a view to cause the distributor valve member 40 to attain the neutral position before the raising lever 39 abuts against the case of the raising unit 12, for example. The hand control lever 20 may if desired be slightly movable to the right, that is downwards or forwards, as a consequence of the pivoting movement to the right of crank-pin 43 due to the action of rod 81, in case for example the maximum raising position of lever 20 corresponds to an end position of arms 18 in the raising direction which exceeds the normally permissible position as defined by the risk of interference for instance of lever 39 with the case of the raising unit 12.

To avoid this inconvenience, the variable stop 128 will be moved (for example by sliding in the groove 124 of sector 118) until the new position determined by the return movement of the rotary valve member 40 under the influence of rod 81 is attained, in order to avoid any subsequent uncontrolled movement of lever 20. If this adjustment is properly made, no further intervention of rod 81 will be necessary for controlling the position.

It may be noted that the provision of a deformable rod 81 does not interfere whatsoever with the servo-action. In fact, if from an initial left-hand or upper position the operator moves the control lever 20 to the right-hand or lowering position, the crank-pin 43 of rotary valve 40 will move to the left, thus reducing the distance between centres of crank-pins 64 and 43 of lever 39 and crank-web 42, respectively. This reduction is not impaired by the rod 81 when the latter is bent downwards about its pivot pin 84 being lowered, since this pin 84 is always located beneath the imaginary straight line drawn between the axes of crankpins 64 and 43.

If under these conditions the operator wishes to switch to servo-action responsive to the controlled effort, he moves the selector control lever 21 from the position illustrated in FIGURE 14 to the left or to the rear of sector 118. Upon completion of its stroke, this lever will engage the retaining notch 120. The selector or engagement/disengagement mechanism having operated as explained hereinabove, connecting-rod 92 is straight and free from cam 108, and the rotary valve crank-pin 43 urged by spring 102 remains in the bottom of the substantially vertical groove 100. The different component elements of the mechanism governing the effort control are then engaged. On the other hand, the position control means are disengaged for rod 66 is kept in its bent or broken position by cam 107 and crank-pin 43 can move freely along the slideway 73 of rod 66.

The input lever 30 or its crank-web 30' connected to the third-point strap 22 through the adjustable connecting link 31 is displaceable between the two adjustable stops 34 and 35. Stop 34 corresponds to the minimum stress and stop 35 to the maximum stress transmitted through strap 22. This minimum stress may have any desired value, for example zero, or a positive value, that is, corresponding to a compression force exerted on the link 31, or even a negative value, that is a value corresponding to a tractive effort exerted on this link 31. In this case one of the elastic pads 28, 29 is expanded instead of being compressed. Assuming that the input lever 30, or its web 30', engages the stop 34, it means that this element is in its minimum stress position. When the operator wishes to control the upward movement of raising arms 18, he pushes the control lever 20 against its limit stop 128 corresponding to the end of the raising movement.

The crank-pin 60 then pivots to the right and carries along the lower end of rocker 87 so that this rocker will pivot in turn about the eccentric 88 while pushing the connecting-rod 92 and therefore the crank-pin 43 of the rotary valve member to the right through the pin 91. The distributor valve 40 is thus brought to the position suitable for controlling the raising movement and the fluid under pressure delivered to cylinder 37 drives the piston back and therefore causes the lever 39 to pivot to the left with its crankpin 64. The distance between centres of crank-pins 64 and 43 increases until the spreading movement of the two-section rod 81 is discontinued and crank-pin 43 is moved to the left for finally restoring the rotary valve member 40 of the distributor to its neutral position, thus stopping the raising movement and causing the pump 13 to deliver fluid to the oil sump 12.

During the period preceding the return of the distributor rotary valve to its neutral position the control lever 20 tends to move to the right somewhat away from the stop 128 corresponding to the end of the raising movement. In fact, the two-armed connecting-rod 92 is carried along to the left by the movement of crank-pin 43 to its neutral position, whereby crank-pin 60 is rotated to the left (FIGURE 14) and the lever 20 solid therewith pivots to the right, since point 88 is momentarily stationary, as the input lever 30 or the crank-web 30' solid therewith engages the stop 34. Therefore, the control lever 20 moves very slightly in spite of the pressure exerted by the friction device 122. The eccentric 88 being adjustable permits of modifying the angle of rotation of crank-pin 43 of rotary valve member 40 and therefore of altering at will the magnitude of the movement of lever 20 to the right.

If the operator wishes to preset a constant effort of predetermined value, he moves the control lever 20 to the right, for example from the centre of sector 118. Then crank-pin 60 rotates to the left, thus causing through rocker 87 and rod 92 the crank-pin 43 to pivot in the left-hand direction and to connect the cylinder to the exhaust, so that the raising arms 18 are lowered. During this downward movement, rod 81 bends about its pivot pin 84. The weight of the instrument or equipment 2 causes the arms 18 to be lowered and to move the piston 37 in the hydraulic cylinder to the right (FIGURE 4), thus discharging the fluid therefrom. Thus, tool 2 is lowered and caused to penetrate into the soil. As a consequence of the resistance offered by the soil, the effort applied to the third-point strap 22 increases and the input lever 30 moves to the right and carries the crank-web 30' to the left. Crank-web 105 will rotate to the right and carry along link 89, eccentric pin 88, rocker 87, connecting-rod 92 and crank-pin 43 in the same direction. When this effort attains a value equal to the value preset by the control lever 20 the rotary valve member 20 of distributor 12 will be in neutral position, for crank-pin 43 will have travelled in the opposite direction the same distance as imposed by the control lever 20, and the sinking movement of the tool 2 will be discontinued.

If the effort exerted on strap 22 became greater or lower than the preset effort, the servo-action linkage would become operative and cause the arms 18 to move up or down, according to cases. Thus, the tool 2 would be somewhat raised or sunk in the ground in order to restore after a short time period the desired effort which remains practically constant. Under these conditions, it is clear that in a same soil the tractive effort and the working depth corresponding thereto can be varied on purpose, provided that the soil is of homogeneous composition.

The operation of the device is particularly simple and easy to understand. The servo-action constantly regulates the vertical position of the tool or instrument so that the tractive effort exerted by the tractor vehicle is constantly equal to a predetermined value preset by means of the control lever 20 on its sector 118.

The operation of this device is extremely reliable due to the safety feature consisting of the accumulator spring 79, the limit rod 81 and the T-shaped slot formed in the deformable connecting-rods 66 and 92.

FIGURE 17 illustrates a modified embodiment of the device shown in FIGURE 14. In this alternate embodiment the two-section rods 66 and 92 of FIGURE 14 are replaced by one-piece rods 132 and 133, respectively. The transverse grooves or notches 74 and 100 of the aforesaid T-shaped slots are maintained at the free end of these rods, and the longitudinal slideways 73, 99 are replaced by their lower edge respectively, which constitutes in these rods the upper longitudinal side edge 134, 135 of their free end which is thus completely separable or detachable from the crank-pin 43 of rotary valve member 40 (unidirectional coupling).

In this modified form of embodiment the angular amplitude of the movement of rotation of valve member 40 in the "raising" direction (which is the counterclockwise direction as shown in the figure) by means of a fixed limit stop 136 rigid with the distributor body 36 and adapted to engage a counter-stop 137 solid with the rotary valve member 40.

The operation of this modified device is exactly similar to that of the preceding form of embodiment, but the construction is considerably simplified.

Of course, the present invention should not be construed as being limited by the specific forms of embodiment shown, described and suggested herein, as any modifications may be brought thereto without departing from the scope of the invention as set forth in the appended claims.

What I claim is:

1. In a device comprising a power operating feedback servo-control system, responsive to manual and automatic sources of control modulation, for a tractor-borne implement three-point trailing hitch for upward and downward swing between raised transporting and lowered grounded working positions, the combination of a rock-shaft journalled in a stationary support and operatively connected to said hitch for raising and lowering same and provided with drive arm means rigid with said rock-shaft, a pressure-fluid actuated one-way ram unit including a cylinder defining a fluid-expansible chamber with a reciprocating piston slidably mounted therein, a piston rod pivotally interconnecting said piston with said drive arm means, a source of pressure fluid supply connected through a transmission line to said chamber, a control valve mechanism inserted in said transmission line for selectively controlling delivery of said pressure fluid to said ram unit to raise said hitch and for exhausting said pressure fluid from said ram unit to lower said hitch, with a valve member shiftable in opposite directions and selectively settable in a fluid locking neutral medial position effective to retain the actual position of said hitch and in either of two active end positions for raising and lowering said hitch on effect of respectively energizing and releasing said ram unit respectively, an adjustable draft load measuring and reflecting arrangement associated at a third attachment point of said hitch with sensitivity adjusting means and shiftable control means progressively movable in opposite directions in proportion to the draft load imposed on said hitch and with double-acting balancing spring means resiliently opposing both forward and rearward tilting of said implement relative to said tractor to determine the extent of displacement of said control means in either direction from a neutral position upon variation of said draft load, a position-responsive valve-actuating first linkage responsive to the position of said implement and positively interconnecting said rock-shaft directly with said valve member, a draft load-responsive valve-actuating second linkage positively interconnecting said control means directly with said valve member, said linkages being separate and operable independently from each other, extending up to and individually reaching said valve member and being exclusively composed of hingedly interconnected rockers and links providing a positively connecting and actuating transmission, and each linkage having an operator-responsive connection with said valve member, whereby in the engaged condition of said connection the respective linkage is positively and operatively connected to said valve member whereas the inoperative disengaged condition of said connection enables movement of said valve member independently of the linkage, a hand lever having an extended range of adjustment, pivoted on said stationary support and formed with at least one crank wrist providing a selectively shiftable fulcrum through which said hand lever is operatively connected to a command-initiating link member of each linkage, said hand lever being adapted to be moved to and to be releasably secured in a selected position setting a predetermined magnitude either of said draft load or of said implement position, the latter being then automatically maintained by the corrective action of the corresponding linkage at a substantially constant value selectively variable through adjustment of said hand lever and independent operator-responsive change-over means controlling said connection of each linkage to selectively condition the device alternatively for controlling said first linkage or said second linkage, said change-over means being adapted to disable either one of said linkages and to simultaneously make the other operative.

2. A device according to claim 1, further comprising biasing spring means directly connected between said valve member and a fixed bracket and adapted on the one hand to take up any slack in the actually operative one of said linkages, and on the other hand to urge said valve member toward its hitch-raising position, and adjustable transport safety shut-off means directly interconnecting said rock-shaft with said valve member, positively in one direction only, for automatically shifting said valve member to said neutral medial position when said hitch is raised to a predetermined maximum height.

3. A device according to claim 2, wherein said first linkage comprises a first rocker having one end pivoted to one of said crank wrists and its other end pivotally connected to one end of a first follow-up link the opposite end of which is pivotally connected to said drive arm means, said first rocker being pivotally connected intermediate its ends to one end of a first force-transmitting link the opposite end of which is pivotally connectible through one of said connections with said valve member, and wherein said second linkage comprises a second rocker having one end pivoted to the other crank wrist and its other end pivotally connected to one end of a second follow-up link the opposite end of which is operatively connected to said control means, said second rocker being pivotally connected intermediate its ends to one end of a second force-transmitting link the opposite end of which is pivotally connectible through the other connection with said valve member.

4. A device according to claim 3, wherein the pivotal connection of said second rocker with said second follow-up link includes position adjusting means allowing variation of the amount of relative displacement of said second rocker.

5. A device according to claim 3, wherein said linkages and said hand lever are movable in a substantially vertical plane and wherein said valve member is a substantially horizontal rotary plug formed endwise with a crank web provided with a crank pin to and from which said force-transmitting links are adapted to be alternatively pivotally connected and disconnected, said biasing spring means being connected to said crank web.

6. A device according to claim 5, wherein said shut-off means consist of a pull rod pivoted at its ends to said drive arm means and to said crank pin respectively and are provided with means for shortening of said pull rod upon reduction of the distance between its pivots and with adjustable stop means to selectively limit said distance in the extended condition of said pull rod.

7. A device according to claim 6, wherein said pull rod consists of two interlinked arms with adjustable stop screw means carried by one of said arms and engageable in abutting relationship by the other arm upon straightening of said pull rod, the pivot interlinking said arms being offset with respect to the center line joining both of said pivots of the pull rod.

8. A device according to claim 6, wherein said force-transmitting links are each formed, at said opposite ends, with a substantially transverse notch opening into a longitudinal side edge of the respective force-transmitting link and toward said crank pin, whereby in said neutral medial position said crank pin is engageable in said notch upon upward swing of the respective force-transmitting link and disengageable from said notch upon downward swing thereof, whereas individual drawback spring means are connected between fixed lugs and said force-transmitting links to urge the latter toward respective engaged positions with said crank pin.

9. A device according to claim 8, further comprising stop means for limiting displacement of said valve member toward said hitch raising position.

10. A device according to claim 8, wherein said change-over means comprise a tumbling shaft journalled on a fixed support and operatively connected for rocking motion to a manual selector lever pivoted to said stationary support and settable in either of two extreme positions corresponding to the operative conditions of said first linkage or of said second linkage, respectively, said tumbling shaft extending across said force-transmitting links in spaced relation thereto, and a pair of spaced disconnecting elements integral with and radially projecting from said tumbling shaft and registering each with one force-transmitting link, said disconnecting elements being secured to said tumbling shaft in mutually angularly staggered relationship and adapted to alternatively engage and be disengaged from said force-transmitting links upon reciprocal rocking motion of said tumbling shaft in such a manner that when one force-transmitting link is operatively connected to said rotary plug in one of said extreme positions of the selector lever, the other force-transmitting link is disconnected therefrom in the other extreme position and vice versa.

11. A device according to claim 10, wherein said disconnecting elements have cam-shaped contours with such a profile as to cause both force-transmitting links to be simultaneously transiently disconnected from said rotary plug in a determined intermediate position of said selector lever.

12. A device according to claim 11, further comprising a pair of lower draft links of adjustable length universally pivoted between the rear end of said tractor and said implement, a top link of adjustable length adapted to be stressed for both compression and tension, pivoted at one end to the upper end of an upright strut integral with said implement and at the other end to an apertured rocker member pivoted to a fixed lug and provided with several holes increasingly spaced from the pivot of said rocker member to allow differing connections with a pivot pin of said top link for varying draft-load reflecting sensitivity, said balancing spring means acting upon said rocker member to resist tilting thereof in either direction and to retain it in a balanced condition, a pair of lift arms rigid with said rock-shaft, a pair of drop links of adjustable length hingedly interconnecting said lift arms and said draft links intermediate the ends of said latter, a bell-crank rocker lever journalled on said stationary support and having one arm pivotally connected through an adjustable positive transmission to said rocker member and its other arm pivotally connected to said opposite end of the second follow-up link, and two adjustable stop means limiting rocking of said bell-crank rocker lever in either direction and corresponding to maximum compression load and tension load respectively upon said top link to provide lock-out against the action of said second linkage.

13. A device according to claim 11, wherein said hand lever and said selector lever are substantially coaxially mounted by means of a rotatably supported plain shaft integral with said hand lever and passing through a hollow shaft integral with said selector lever and rotatably mounted on said plain shaft, the device further comprising a slotted sector formed with at least one guide slot arcuate about the common pivot axis of said hand and said selector levers, and with at least two spaced gabs, said selector lever yieldably and slidably bearing sidewise against said sector and being adapted to engage said gabs in its two extreme positions, whereas said hand lever, which also rides on said sector, is fitted with resilient clamping means guidingly received in said slot and adapted to automatically retain said hand lever in any selected adjusted position in frictional contact with said sector, and relatively fixed position-adjustable stop means for said hand lever, at least one of which defines an uppermost lift position for said hitch.

14. A device according to claim 13, further comprising a housing at the rear end of said tractor, journalling said rock-shaft, enclosing and supporting said linkages of the device, said valve mechanism, said ram units and said piston rod, said housing forming an oil sump, a continuously driven pump having an inlet connected through a suction pipe to said oil sump and an outlet connected through a discharge pipe to said valve mechanism, the latter comprising a casing formed with a pressure intake port connected to said discharge pipe, with an exhaust port opening into said oil sump, with a feed port connected through a duct to said ram unit, and with a main bore communicating, via corresponding ducts, with said ports and with said oil sump respectively, and accommodating said rotary plug, a spring-loaded check valve inserted between said feed port and said main bore and formed with a member projecting into said bore whereby said check valve is engageable by said rotary plug to be positively opened thereby, a spring-loaded exhaust valve inserted between said main bore and said exhaust port and consisting of a plunger slidably mounted in a chamber formed in said casing and communicating with said bore whereby said exhaust valve is adapted to be hydraulically closed, and an overload relief valve fitted in said rotary plug and leading to said oil sump, said rotary plug being so shaped that when it is in neutral position, it blocks both delivery of said pressure fluid to, and exhaust of fluid from, said ram unit upon resiliently self-actuated closure of said check valve and spring-balanced opening of said exhaust valve, said rotary plug being rotatable in one direction from said neutral position to initiate the delivery of said pressure fluid to said ram unit upon feeding said chamber with pressure fluid to hydraulically close said exhaust valve, said rotary plug being also rotatable in the opposite direction from said neutral position to initiate the exhaust of said pressure fluid from said ram unit upon engaging said check valve to positively open it, on the one hand, and, on the other hand, allowing said exhaust valve to open by allowing said pressure fluid to be discharged from said chamber.

15. A device according to claim 11, wherein said force-transmitting links are resilient only in a direction as to initiate disengagement of said crank pin from said transverse notch which opens into a longitudinal slot formed in the respective force-transmitting link, thereby allowing lost motion of said crank pin therein, said notch and said slot forming together a substantially T-shaped aperture.

16. A device according to claim 15, wherein said force-transmitting links consist of two hingedly inter-connected parts fitted with a return spring permanently urging said parts toward a substantially aligned position in extension of each other, one of said parts being formed with an abutment determining said aligned position and permitting bending of the respective link only in a direction which initiates disengagement of said crank pin from said transverse notch, one of said parts of the link which is pivoted to said rocker being engageable by the relevant one of said cam-shaped disconnecting elements.

17. A device according to claim 15, wherein said force-transmitting links consist of two hingedly inter-connected parts fitted with a return spring permanently urging said parts toward a substantially aligned position in extension of each other, one of said parts being formed with an abutment determining said aligned position and permitting bending of the respective link only in a direction which initiates disengagement of said crank pin from said transverse notch, one of said parts of the link which is pivoted to said rocker being engageable by the relevant one of said cam-shaped disconnecting elements.

18. A device according to claim 3, wherein said linkages and said hand lever are movable in a substantially vertical plane and wherein said valve member is a substantially horizontal rotary plug formed endwise with a crank web provided with a crank pin to and from which said force-transmitting links are adapted to be alternatively pivotally connected and disconnected, said biasing spring means being connected to said crank web.

19. A device according to claim 18, wherein said force-transmitting links are each formed, at said opposite ends, with a substantially transverse notch opening into a longitudinal side edge of the respective force-transmitting link and toward said crank pin, whereby in said neutral medial position said crank pin is engageable in said notch upon upward swing of the respective force-transmitting link and disengageable from said notch upon downward swing thereof, whereas individual drawback spring means are connected between fixed lugs and said force-transmitting links to urge the latter toward respective engaged positions with said crank pin.

20. A device according to claim 18, wherein said change-over means comprise a tumbling shaft journalled on a fixed support and operatively connected for rocking motion to a manual selector lever pivoted to said stationary support and settable in either of two extreme positions corresponding to the operative conditions of said first linkage or of said second linkage, respectively, said tumbling shaft extending across said force-transmitting links in spaced relation thereto, and a pair of spaced disconnecting elements integral with and radially projecting from said tumbling shaft and registering each with one force-transmitting link, said disconnecting elements being secured to said tumbling shaft in mutually angularly staggered relationship and adapted to alternatively engage and be disengaged from said force-transmitting links upon reciprocal rocking motion of said tumbling shaft in such a manner that when one force-transmitting link is operatively connected to said rotary plug in one of said extreme positions of the selector lever, the other force-transmitting link is disconnected therefrom in the other extreme position and vice versa.

21. A device according to claim 20, wherein said hand lever and said selector lever are substantially coaxially mounted on said plain shaft, the device further comprising integral with said hand lever and passing through a hollow shaft integral with said selector lever and rotatably mounted on said plan shaft, the device further comprising a slotted sector formed with at least one guide slot arcuate about the common pivot axis of said hand and said selector levers, and with at least two spaced gabs, said selector lever yieldably and slidably bearing sidewise against said sector and being adapted to engage said gabs in its two extreme positions, whereas said hand lever, which also rides on said sector, is fitted with resilient clamping means guidingly received in said slot and adapted to automatically retain said hand lever in any selected adjusted position in frictional contact with said sector, and relatively fixed position-adjustable stop means for said hand lever, at least one of which defines an uppermost lift position for said hitch.

References Cited by the Examiner
UNITED STATES PATENTS

| | | | |
|---|---|---|---|
| 2,721,508 | 10/55 | Edman | 172—10 |
| 2,786,402 | 3/57 | Senkowski et al | 172—9 |
| 2,804,814 | 9/57 | Czarnocki | 172—7 |
| 2,924,285 | 2/60 | Dunshan et al | 172—9 |
| 2,996,124 | 8/61 | Bunting | 172—9 |
| 2,996,125 | 8/61 | Bunting | 172—9 |

FOREIGN PATENTS

| | | |
|---|---|---|
| 1,238,877 | 7/60 | France. |
| 289,297 | 7/53 | Switzerland. |

ABRAHAM G. STONE, *Primary Examiner.*

T. GRAHAM CRAVER, *Examiner.*